United States Patent
Pei et al.

(10) Patent No.: US 12,504,824 B2
(45) Date of Patent: Dec. 23, 2025

(54) REAL-TIME TACTILE SENSATION GENERATION METHOD AND RELATED DEVICE

(71) Applicant: AAC Acoustic Technologies (Shanghai) Co., Ltd., Shanghai (CN)

(72) Inventors: Shiyu Pei, Shanghai (CN); Yajun Zheng, Shanghai (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 212 days.

(21) Appl. No.: 18/404,823

(22) Filed: Jan. 4, 2024

(65) Prior Publication Data
US 2024/0411371 A1    Dec. 12, 2024

Related U.S. Application Data

(63) Continuation of application No. PCT/CN2023/098603, filed on Jun. 6, 2023.

(51) Int. Cl.
*G06F 3/16*     (2006.01)
*G06F 3/01*     (2006.01)
*G06F 3/044*    (2006.01)

(52) U.S. Cl.
CPC ............. *G06F 3/016* (2013.01); *G06F 3/044* (2013.01); *G06F 3/162* (2013.01); *G06F 3/167* (2013.01)

(58) Field of Classification Search
CPC .......... G06F 3/016; G06F 3/044; G06F 3/162; G06F 3/167
See application file for complete search history.

(56) References Cited

U.S. PATENT DOCUMENTS

2012/0130154 A1*  5/2012  Sajan ............... G10L 21/06
                                                600/23
2024/0221771 A1*  7/2024  Pei ................. G10L 21/0332

OTHER PUBLICATIONS

Yonghee You et al., Experiments on the Tactile Effects of a Sound-Specific Vibration Interface, Oct. 10, 2008, International Conference on Networked Computing and Advanced Information Management, pp. 444-449 (Year: 2008).*

Hongshen Shi et al., Touching the Sound—Audible Features Enable Haptics for Robot Control, Dec. 9, 2022, IEEE Robotics & Automation Magazine, pp. 56-68 (Year: 2022).*

* cited by examiner

*Primary Examiner* — Tam T Tran
(74) *Attorney, Agent, or Firm* — Wiersch Law Group

(57) ABSTRACT

A real-time tactile sensation generation method includes following steps: acquiring a plurality of frames of audio signals by reading an original audio frame by frame; and determining on and off states of a tactile switch: outputting, when the tactile switch is in the off state, the audio signal after high-pass filtering to the vibration-audio integrated device to achieve a separate sound effect; wherein a frequency of the high-pass filtering matches a capacitance value; and generating, when the tactile switch is in the on state, a vibration signal, fusing the audio signal of the current frame after high-pass filtering with the corresponding vibration signal, and outputting a fused signal to the vibration-audio integrated device to achieve a real-time tactile effect of combining sound and vibration. Compared with the related art, the real-time tactile sensation generation method and the related device provided in the present disclosure achieve better real-time tactile feedback experience.

9 Claims, 5 Drawing Sheets

REAL-TIME TACTILE SENSATION GENERATION METHOD AND RELATED DEVICE

CROSS-REFERENCE TO RELATED APPLICATIONS

This application is a continuation of International Application No. PCT/CN2023/098603, filed on Jun. 6, 2023, which is hereby incorporated by reference in its entirety.

TECHNICAL FIELD

The present disclosure relates to the technical field of real-time tactile sensation generation methods, and in particular, to a real-time tactile sensation generation method and a related device that are applied to a vibration-audio integrated device.

BACKGROUND

With the development of electronic products, people have higher requirements for effects of sound and vibration feedback. Therefore, more and more electronic terminals such as mobile phones and tablet computers are provided with speakers as audio output and vibration motors as vibration feedback output. However, with the improvement of functions of the electronic products, a number of components is also increasing, the cost is increasing, and a space occupied by each component is getting smaller and smaller. A vibration and audio two-in-one output device has great potential in the application of devices such as mobile phones due to advantages of low power consumption of an entire apparatus, simple signal transmission path hardware, and a low manufacturing cost.

In the related art, the vibration and audio two-in-one output device is also called a vibration-audio integrated device or a sound-vibration integrated device, including a vibration actuator and a sound actuator connected in series and a capacitor connected in parallel with the vibration actuator. Then, input ends of the vibration actuator and the sound actuator are respectively connected to a signal input line, and the vibration actuator and the sound actuator are respectively driven by input of a separate vibration signal and a separate audio signal. However, in the method, vibration and audio trigger signals are inputted and executed separately, vibration feedback is programmed in advance according to a scene design, and the vibration feedback formed does not have a real-time feedback effect, so real-time tactile sensation experience is not good.

Therefore, it is necessary to provide a new real-time tactile sensation generation method and a related device to solve the above technical problems.

SUMMARY

An objective of the present disclosure is to provide a real-time tactile sensation generation method and a related device that are applied to a vibration-audio integrated device, which effectively improves a real-time tactile feedback experience effect thereof.

In order to achieve the above objective, a first aspect of the present disclosure provides a real-time tactile sensation generation method, applied to a vibration-audio integrated device. The vibration-audio integrated device includes a vibration actuator configured to generate vibration and a sound actuator configured to generate sound connected in series, and a capacitor connected in parallel with the vibration actuator. The real-time tactile sensation generation method includes the following steps:

acquiring a plurality of frames of audio signals by reading an original audio frame by frame; and determining on and off states of a tactile switch; wherein the tactile switch is configured to control an operating state of the vibration actuator:

outputting, when the tactile switch is in the off state, the audio signal after high-pass filtering to the vibration-audio integrated device to achieve a separate sound effect; wherein a frequency of the high-pass filtering matches a capacitance value; and generating, when the tactile switch is in the on state, a vibration signal corresponding to the audio signal of a current frame, fusing the audio signal of the current frame after high-pass filtering with the corresponding vibration signal, and outputting a fused signal to the vibration-audio integrated device to achieve a real-time tactile effect of combining sound and vibration.

In an embodiment, the original audio is read frame by frame, every 200 ms is taken as one frame.

In an embodiment, the step of acquiring a plurality of frames of audio signals by reading an original audio frame by frame further includes: determining a number of channels of the original audio when a first frame of each original audio is read, and selecting, when two channels exist, an average value of two-channel data during reading of each frame.

In an embodiment, in the step of determining on and off states of a tactile switch, the generating, when the tactile switch is in the on state, a vibration signal corresponding to the audio signal of a current frame includes the following sub-steps:

reading the audio signal of the current frame, acquiring instantaneous power thereof, and tracking and acquiring a power envelope thereof through a filter; and adaptively generating a vibration threshold according to the power envelope, setting a part of the power envelope that is greater than the vibration threshold to 1, and otherwise setting to 0 to obtain a vibration gain envelope, and filling the vibration gain envelope with a vibration signal.

In an embodiment, the step of adaptively generating a vibration threshold according to the power envelope, setting a part of the power envelope that is greater than the vibration threshold to 1, and otherwise setting to 0 to obtain a vibration gain envelope, and filling the vibration gain envelope with a vibration signal includes:

constructing an adaptive vibration threshold $T(t)$: $T(t)=f(T(t-1), E(t))$, so that, when $E(t)$ is greater than $T(t-1)$, the threshold $T(t)$ is adjusted upwards, and otherwise the threshold $T(t)$ is adjusted downwards to obtain the vibration gain envelope G; where t denotes the $t^{th}$ time of the current frame, $f(\ )$ denotes a constructed nonlinear function, and E denotes the power envelope; and convolving the vibration gain envelope G with a signal with a length L and a value x to obtain an updated vibration gain envelope G', and finally generating a vibration signal $H=G'*S$; where S denotes a vibration base signal, and the vibration base signal is a single-frequency sinusoidal signal composed of a resonant frequency f0 of the vibration actuator and a rated voltage vrms and having a same length as the audio signal.

In an embodiment, in the step of determining on and off states of a tactile switch, the fusing the audio signal of the current frame after high-pass filtering with the corresponding vibration signal, and outputting a fused signal to the vibration-audio integrated device includes:

adding the vibration signal and the audio signal after high-pass filtering, performing normalization to obtain a final fused signal, and inputting the final fused signal to the vibration-audio integrated device.

In a second aspect, the present disclosure further provides a real-time tactile sensation generation system, applied to a vibration-audio integrated device, the system including:

an audio reading module configured to acquire a plurality of frames of audio signals by reading an original audio frame by frame; and a high-pass filtering module configured to filter the audio signal;

a determination execution module configured to determine on and off states of a tactile switch; wherein the tactile switch is configured to control an operating state of the vibration actuator:

output, when the tactile switch is in the off state, the audio signal after high-pass filtering to the vibration-audio integrated device to achieve a separate sound effect; and trigger, when the tactile switch is in the on state, a vibration signal generation module to operate;

the vibration signal generation module being configured to generate a corresponding vibration signal to achieve real-time touch based on the audio signal of the current frame when the determination execution module determines that the tactile switch is in the on state; and a fusion module configured to fuse, when the tactile switch is in the on state, the audio signal of the current frame filtered by the high-pass filtering module with the vibration signal corresponding thereto, to generate a fused signal to achieve a real-time tactile effect of combining sound and vibration.

In an embodiment, the audio reading module is further configured to determine a number of channels of the original audio when a first frame of each original audio is read, and select, when two channels exist, an average value of two-channel data during reading of each frame.

In a third aspect, the present disclosure further provides an electronic device, including a processor, a memory, and a real-time tactile sensation generation program stored in the memory and executable by the processor, wherein, when the real-time tactile sensation generation program is executed by the processor, steps in the real-time tactile sensation generation method as provided in the present disclosure are implemented.

In a fourth aspect, the present disclosure further provides a non-transitory computer-readable storage medium, wherein the non-transitory computer-readable storage medium stores a real-time tactile sensation generation program, and when the real-time tactile sensation generation program is executed by a processor, steps in the real-time tactile sensation generation method as provided in the present disclosure are implemented.

BRIEF DESCRIPTION OF DRAWINGS

In order to illustrate the technical solutions in the embodiments of the present disclosure more clearly, the accompanying drawings to be used in the description of the embodiments will be briefly introduced below. The accompanying drawings in the following description are only some embodiments of the present disclosure. For those skilled in the art, other accompanying drawings can be obtained based on these drawings. In the drawings.

DESCRIPTION OF EMBODIMENTS

The technical solutions in the embodiments of the present disclosure will be clearly and completely described below with reference to the accompanying drawings in the embodiments of the present disclosure. Obviously, the described embodiments are only some of the embodiments of the present disclosure, but not all of the embodiments. Based on the embodiments of the present disclosure, all other embodiments obtained by those skilled in the art without creative efforts fall within the protection scope of the present disclosure.

Embodiment 1

Figure 1:
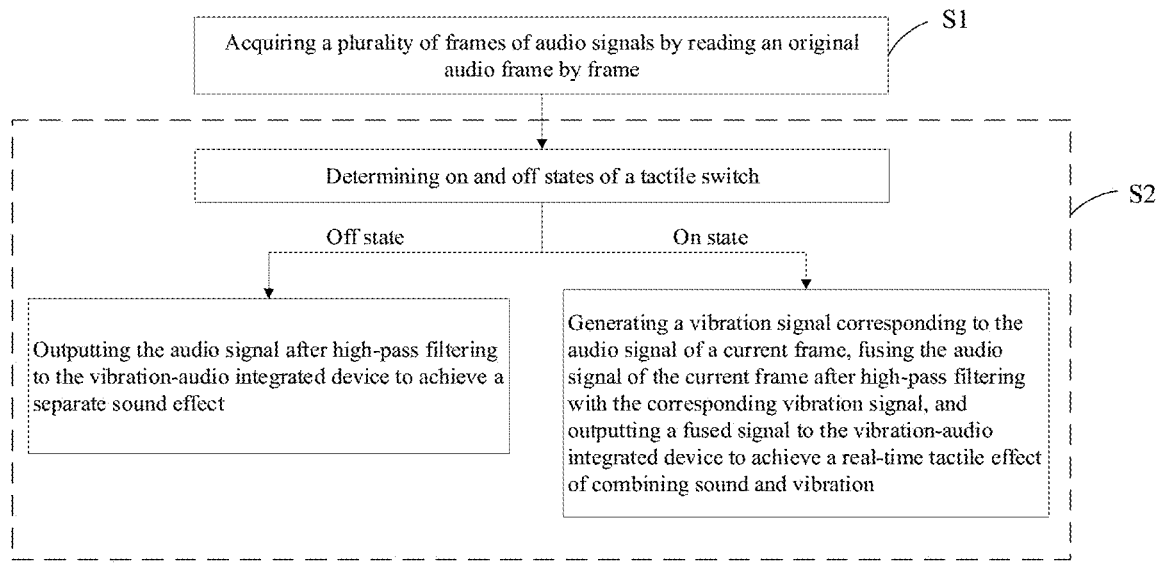
FIG. 1 is a flowchart block diagram of a real-time tactile sensation generation method according to an embodiment of the present disclosure.
Figure 2:
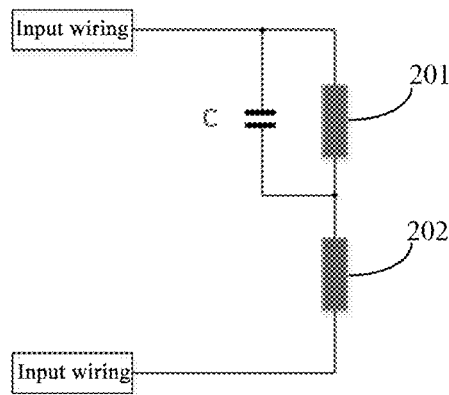
FIG. 2 is a schematic diagram of an internal structure of a vibration-audio integrated device applied to the real-time tactile sensation generation method according to an embodiment of the present disclosure.

Referring to FIG. 1, an embodiment of the present disclosure provides a real-time tactile sensation generation method, applied to a vibration-audio integrated device. Referring to FIG. 2, FIG. 2 is a schematic diagram of an internal structure of a vibration-audio integrated device applied to the real-time tactile sensation generation method according to an embodiment of the present disclosure. The vibration-audio integrated device 200 includes a vibration actuator 201 and a sound actuator 202 connected in series and a capacitor C connected in parallel with the vibration actuator 201. The vibration actuator 201 is configured to generate vibration. The sound actuator 202 is configured to generate sound.

The real-time tactile sensation generation method includes the following steps.

In step S1, a plurality of frames of audio signals is acquired by reading an original audio frame by frame.

In this embodiment, when the original audio is read frame by frame, the audio signal y is read by taking every 200 ms as one frame. One frame is not limited to every 200 ms above, which may be defined according to an actual requirement.

In an embodiment, in this step, a number of channels of the original audio is determined first when a first frame of each original audio is read:

each subsequent frame is continuously read normally in the case of a single channel; and an average value of two-channel data is selected during reading of each frame when two channels exist.

In step S2, on and off states of a tactile switch are determined. The tactile switch is configured to control an operating state of the vibration actuator. The tactile switch may be implemented by a hardware circuit or by a software program, which is easy to think of. A specific state is determined as follows.

When the tactile switch is in the off state, the audio signal is outputted to the vibration-audio integrated device 200 after high-pass filtering to achieve a separate sound effect. A frequency of the high-pass filtering matches a capacitance value of the capacitor C.

When the tactile switch is in the on state, a vibration signal corresponding to the audio signal of a current frame is generated, the audio signal of the current frame after high-pass filtering is fused with the corresponding vibration signal, and a fused signal is outputted to the vibration-audio integrated device 200 to achieve a real-time tactile effect of combining sound and vibration.

Figure 3:
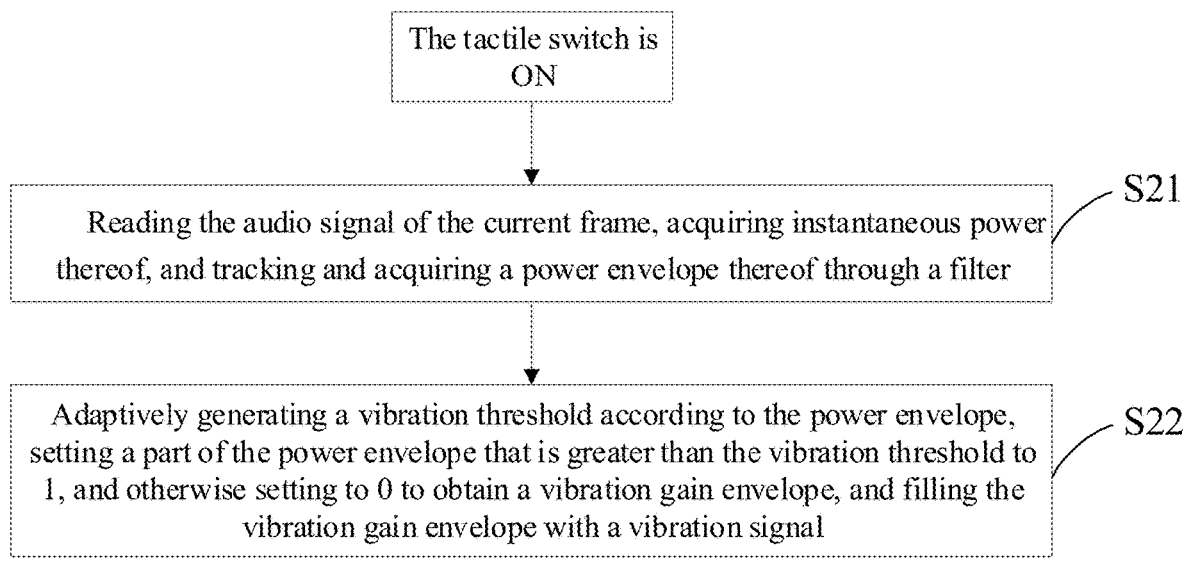
FIG. 3 is a sub-flow block diagram of step S2 in the real-time tactile sensation generation method according to an embodiment of the present disclosure.

In this embodiment, in step S2 of determining on and off states of a tactile switch, the generating, when the tactile switch is in the on state, a vibration signal corresponding to the audio signal of a current frame includes the following sub-steps. Refer to FIG. 3.

In step S21, the audio signal y of the current frame is read, instantaneous power $y^2$ thereof is acquired, and a power envelope E thereof is tracked and acquired. The power envelope E thereof is tracked and acquired through a filter, which may be tracked and acquired in other feasible manners in the prior art.

In step S22, a vibration threshold T is adaptively generated according to the power envelope E, a part of the power envelope E that is greater than the vibration threshold T is set to 1, and otherwise set to 0 to obtain a vibration gain envelope G, and the vibration gain envelope G is filled with a vibration signal H.

In this embodiment, step S22 is further described.

The vibration threshold T(t) is adaptively generated:

$$T(t)=f(T(t-1),E(t)),$$

so that, when E(t) is greater than T(t−1), the threshold T(t) is adjusted upwards, and otherwise the threshold T(t) is adjusted downwards to obtain the vibration gain envelope G; where t denotes the $t^{th}$ time of the current frame, f( ) denotes a constructed nonlinear function, and E denotes the power envelope.

Figure 4:
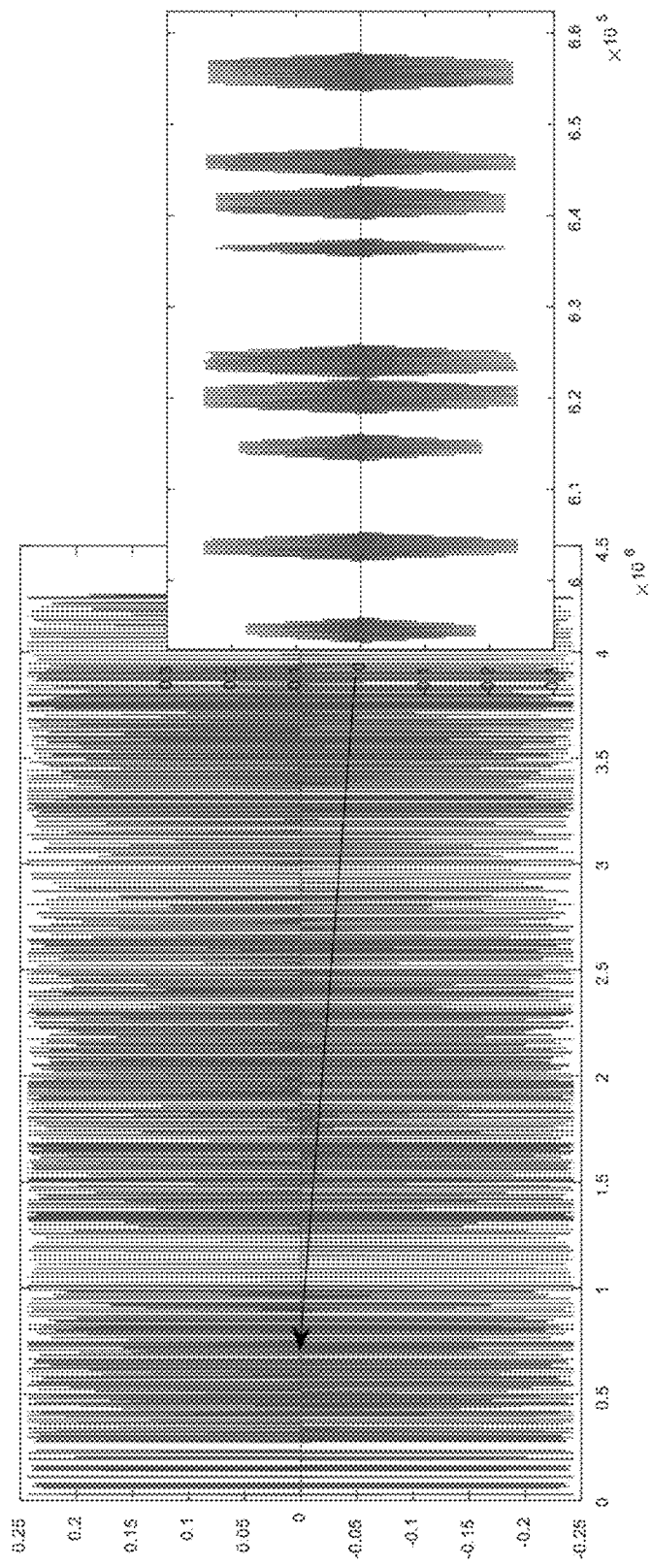
FIG. 4 is a schematic diagram of a multi-frame vibration signal in the real-time tactile sensation generation method according to an embodiment of the present disclosure.

The vibration gain envelope G with a signal with a length L and a value x (e.g., x=1/L) is convolved to obtain an updated vibration gain envelope G', so that each vibration region may have a corresponding fade-in and fade-out effect to prevent the sound actuator 202 in the vibration-audio integrated device 200 from making abnormal noise, and a vibration signal H=G'*S is finally generated; where S denotes a vibration base signal, and the vibration base signal is a single-frequency sinusoidal signal composed of a resonant frequency f0 of the vibration actuator 201 and a rated voltage vrms and having a same length as the audio signal y. FIG. 4 is a schematic diagram of a multi-frame vibration signal in a real-time tactile sensation generation method according to an embodiment of the present disclosure.

The updated vibration gain envelope G' obtained by convolution may be further adjusted with reference to the instantaneous power $y^2$ of the audio signal y, so that the vibration effect can better adapt to intensity fluctuations of the audio signal.

Figure 5:
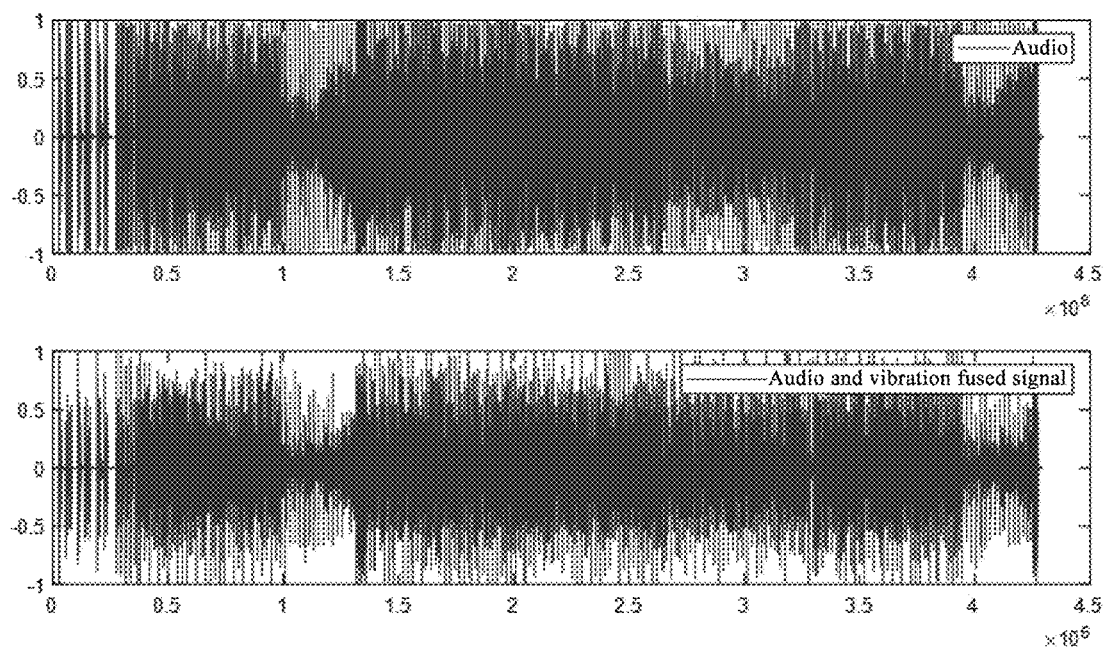
FIG. 5 is a schematic diagram of a multi-frame fused signal when a tactile switch is ON in the real-time tactile sensation generation method according to an embodiment of the present disclosure.

In this embodiment, in step S2 of determining on and off states of a tactile switch, the fusing the audio signal of the current frame after high-pass filtering with the corresponding vibration signal, and outputting a fused signal to the vibration-audio integrated device 200 includes:

when the tactile switch is in the on state, adding the vibration signal H and the audio signal y after high-pass filtering, and performing normalization to obtain a final fused signal y'. FIG. 5 is a schematic diagram of a multi-frame fused signal when a tactile switch is ON in the real-time tactile sensation generation method according to an embodiment of the present disclosure. The final fused signal y' is inputted to the vibration-audio integrated device 200 to achieve a corresponding effect combining sound and touch.

Figure 6:
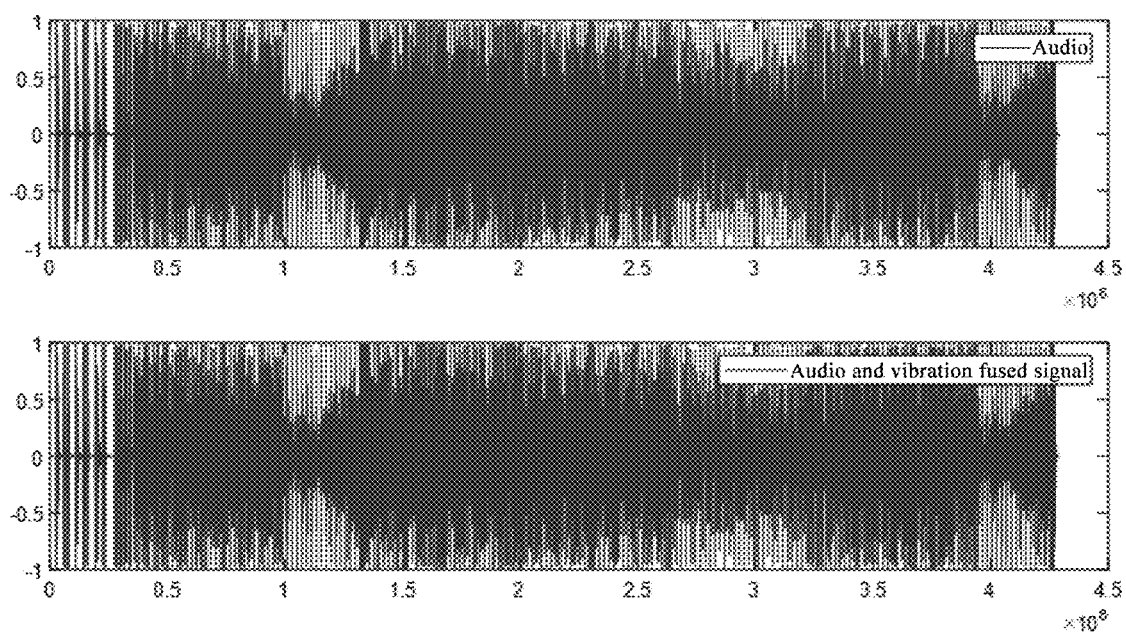
FIG. 6 is a schematic diagram of the multi-frame fused signal when the tactile switch is OFF in the real-time tactile sensation generation method according to an embodiment of the present disclosure.

It is to be noted that, in step S2, when the tactile switch is in the off state, the vibration signal H is all 0. That is, the final fused signal y' after fusion is only the audio signal after high-pass filtering. FIG. 6 is a schematic diagram of the multi-frame fused signal when the tactile switch is OFF in the real-time tactile sensation generation method according to an embodiment of the present disclosure. The final fused signal y' is inputted to the vibration-audio integrated device 200 to achieve a separate sound effect.

Compared with the related art, according to the real-time tactile sensation generation method in the present disclosure, firstly, a plurality of frames of audio signals is acquired by reading an original audio frame by frame; and then on and off states of a tactile switch are determined: outputting, when the tactile switch is in the off state, the audio signal after high-pass filtering to the vibration-audio integrated device to achieve a separate sound effect; wherein a frequency of the high-pass filtering matches a capacitance value; and generating, when the tactile switch is in the on state, a vibration signal corresponding to the audio signal of a current frame, fusing the audio signal of the current frame after high-pass filtering with the corresponding vibration signal, and outputting a fused signal to the vibration-audio integrated device to achieve a real-time tactile effect of combining sound and vibration. Through the above method, real-time matching between the generated vibration signal and the audio signal is achieved, so that the real-time tactile sensation experience effect of the vibration-audio integrated device is better.

Embodiment 2

Figure 7:
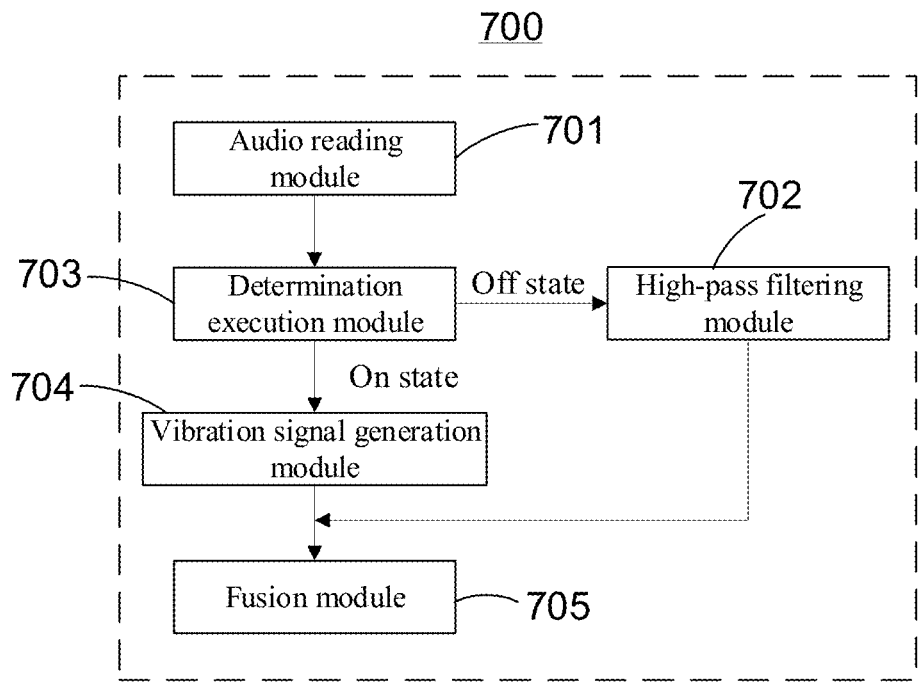
FIG. 7 is a structural block diagram of a real-time tactile sensation generation system according to an embodiment of the present disclosure.

Referring to FIG. 2 and FIG. 7, an embodiment of the present disclosure further provides a real-time tactile sensation generation system 700, applied to a vibration-audio integrated device 200. The vibration-audio integrated device 200 includes a vibration actuator 201 and a sound actuator 202 connected in series and a capacitor C connected in parallel with the vibration actuator 201. The vibration actuator 201 is configured to generate vibration. The sound actuator 202 is configured to generate sound.

The real-time tactile sensation generation system 700 includes the following modules.

An audio reading module 701 is configured to acquire a plurality of frames of audio signals by reading an original audio frame by frame.

In this embodiment, when reading the original audio frame by frame, the audio reading module 701 reads the audio signal y by taking every 200 ms as one frame. One frame is not limited to every 200 ms above, which may be defined according to an actual requirement.

In an embodiment, in this step, the audio reading module 701 first determines a number of channels of the original audio when reading a first frame of each original audio: continues to read each subsequent frame normally in the case of a single channel; and selects, when two channels exist, an average value of two-channel data during reading of each frame.

A high-pass filtering module 702 is configured to filter the audio signal.

A determination execution module 703 is configured to determine on and off states of a tactile switch, and generate a corresponding vibration signal according to a state. The tactile switch is configured to control an operating state of the vibration actuator. The tactile switch may be implemented by a hardware circuit or by a software program, which is easy to think of. That the determination execution module 703 determines the state of the tactile switch includes the tactile switch being in the off state and the tactile switch being in the on state.

A vibration signal generation module 704 is configured to generate a corresponding vibration signal to achieve real-time touch based on the audio signal of the current frame when the determination execution module 703 determines that the tactile switch is in the on state.

When the tactile switch is in the off state (that is, the generated vibration signal is 0), the audio signal filtered by the high-pass filtering module 702 is outputted to the vibration-audio integrated device 200 to achieve a separate sound effect. A frequency of the high-pass filtering matches a capacitance value of the capacitor C.

When the tactile switch is in the on state, a vibration signal corresponding to the audio signal of the current frame is generated by the vibration signal generation module 704.

In an embodiment, the audio signal y of the current frame is read, instantaneous power $y^2$ thereof is acquired, and a power envelope E thereof is tracked and acquired through a filter. The power envelope E thereof is tracked and acquired through a filter, which may be tracked and acquired in other feasible manners in the prior art. A vibration threshold T is adaptively generated according to the power envelope E, a part of the power envelope E that is greater than the vibration threshold T is set to 1, and otherwise set to 0 to obtain a vibration gain envelope G, and the vibration gain envelope G is filled with a vibration signal H.

In an embodiment, the vibration threshold T(t) is adaptively generated:

$T(t)=f(T(t-1),E(t))$, so that, when E(t) is greater than T(t−1), the threshold T(t) is adjusted upwards, and otherwise the threshold T(t) is adjusted downwards to obtain the vibration gain envelope G; where t denotes the $t^{th}$ time of the current frame, f( ) denotes a constructed nonlinear function, and E denotes the power envelope.

The vibration gain envelope G with a signal with a length L and a value x (e.g., x=1/L) is convolved to obtain an updated vibration gain envelope G', so that each vibration region may have a corresponding fade-in and fade-out effect to prevent the sound actuator 202 in the vibration-audio integrated device 200 from making abnormal noise, and a vibration signal H=G'*S is finally generated; where S denotes a vibration base signal, and the vibration base signal is a single-frequency sinusoidal signal composed of a resonant frequency f0 of the vibration actuator 201 and a rated voltage vrms and having a same length as the audio signal y. FIG. 4 is a schematic diagram of a multi-frame vibration signal in a real-time tactile sensation generation method according to an embodiment of the present disclosure.

The updated vibration gain envelope G' obtained by convolution may be further adjusted with reference to the instantaneous power $y^2$ of the audio signal y, so that the vibration effect can better adapt to intensity fluctuations of the audio signal.

A fusion module 705 is configured to fuse, when the tactile switch is in the on state, the audio signal filtered by the high-pass filtering module 702 with the vibration signal generated by the vibration signal generation module 704 and corresponding to the audio signal, to generate a fused signal.

In an embodiment, the vibration signal H and the audio signal y after high-pass filtering are added and normalized as a final fused signal y'. FIG. 5 is a schematic diagram of a multi-frame fused signal when a tactile switch is ON in the real-time tactile sensation generation method according to an embodiment of the present disclosure. The final fused signal y' is inputted to the vibration-audio integrated device 200 to achieve a corresponding effect combining sound and touch.

It is to be noted that, when the tactile switch is in the off state, the vibration signal H is all 0, and the final fused signal y' after fusion by the fusion module 705 is only the audio signal after high-pass filtering. FIG. 6 is a schematic diagram of the multi-frame fused signal when the tactile switch is OFF in the real-time tactile sensation generation method according to an embodiment of the present disclosure. The final fused signal y' is inputted to the vibration-audio integrated device 200 to achieve a separate sound effect.

In this embodiment, the technical effect achieved by the real-time tactile sensation generation system and its principle are the same as the technical effect achieved by the real-time tactile sensation generation method provided above in the present disclosure and its principle. Details are not described herein again.

Embodiment 3

Figure 8:
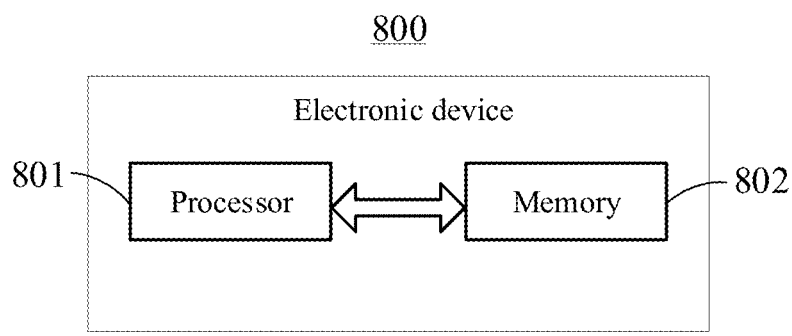
FIG. 8 is a structural block diagram of an electronic device according to an embodiment of the present disclosure.

Referring to FIG. 8, the present disclosure further provides an electronic device 800. The electronic device 800 includes a processor 801, a memory 802, and a real-time tactile sensation generation program stored in the memory 801 and executable by the processor 802. When the real-time tactile sensation generation program is executed by the processor 801, steps in the real-time tactile sensation generation method as provided in the present disclosure are implemented.

In step S1, a plurality of frames of audio signals is acquired by reading an original audio frame by frame.

In this embodiment, when the original audio is read frame by frame, the audio signal y is read by taking every 200 ms as one frame. One frame is not limited to every 200 ms above, which may be defined according to an actual requirement.

In an embodiment, in this step, a number of channels of the original audio is determined first when a first frame of each original audio is read:

each subsequent frame is continuously read normally in the case of a single channel; and an average value of two-channel data is selected during reading of each frame when two channels exist.

In step S2, on and off states of a tactile switch are determined. The tactile switch is configured to control an operating state of the vibration actuator. The tactile switch may be implemented by a hardware circuit or by a software program, which is easy to think of. A specific state is determined as follows:

When the tactile switch is in the off state, the audio signal is outputted to the vibration-audio integrated device 200 after high-pass filtering to achieve a separate sound effect. A frequency of the high-pass filtering matches a capacitance value of the capacitor C.

When the tactile switch is in the on state, a vibration signal corresponding to the audio signal of a current frame is generated, the audio signal of the current frame after high-pass filtering is fused with the corresponding vibration signal, and a fused signal is outputted to the vibration-audio integrated device 200 to achieve a real-time tactile effect of combining sound and vibration.

In this embodiment, in step S2 of determining on and off states of a tactile switch, the generating, when the tactile switch is in the on state, a vibration signal corresponding to the audio signal of a current frame includes the following sub-steps. Refer to FIG. 3.

In step S21, the audio signal y of the current frame is read, instantaneous power $y^2$ thereof is acquired, and a power envelope E thereof is tracked and acquired. The power envelope E thereof is tracked and acquired through a filter, which may be tracked and acquired in other feasible manners in the prior art.

In step S22, a vibration threshold T is adaptively generated according to the power envelope E, a part of the power envelope E that is greater than the vibration threshold T is set to 1, and otherwise set to 0 to obtain a vibration gain envelope G, and the vibration gain envelope G is filled with a vibration signal H.

In this embodiment, step S22 is further described.
The vibration threshold T(t) is adaptively generated:

$$T(t)=f(T(t-1),E(t)),$$

so that, when E(t) is greater than T(t−1), the threshold T(t) is adjusted upwards, and otherwise the threshold T(t) is adjusted downwards to obtain the vibration gain envelope G; where t denotes the $t^{th}$ time of the current frame, f( ) denotes a constructed nonlinear function, and E denotes the power envelope.

The vibration gain envelope G with a signal with a length L and a value x (e.g., x=1/L) is convolved to obtain an updated vibration gain envelope G', so that each vibration region may have a corresponding fade-in and fade-out effect to prevent the sound actuator 202 in the vibration-audio integrated device 200 from making abnormal noise, and a vibration signal H=G'*S is finally generated; where S denotes a vibration base signal, and the vibration base signal is a single-frequency sinusoidal signal composed of a resonant frequency f0 of the vibration actuator 201 and a rated voltage vrms and having a same length as the audio signal y. FIG. 4 is a schematic diagram of a multi-frame vibration signal in a real-time tactile sensation generation method according to an embodiment of the present disclosure.

The updated vibration gain envelope G' obtained by convolution may be further adjusted with reference to the instantaneous power $y^2$ of the audio signal y, so that the vibration effect can better adapt to intensity fluctuations of the audio signal.

In this embodiment, in step S2 of determining on and off states of a tactile switch, the fusing the audio signal of the current frame after high-pass filtering with the corresponding vibration signal, and outputting a fused signal to the vibration-audio integrated device 200 includes:

when the tactile switch is in the on state, adding the vibration signal H and the audio signal y after high-pass filtering, and performing normalization to obtain a final fused signal y'. FIG. 5 is a schematic diagram of a multi-frame fused signal when a tactile switch is ON in the real-time tactile sensation generation method according to an embodiment of the present disclosure. The final fused signal y' is inputted to the vibration-audio integrated device 200 to achieve a corresponding effect combining sound and touch.

It is to be noted that, in step S2, when the tactile switch is in the off state, the vibration signal H is all 0. That is, the final fused signal y' after fusion is only the audio signal after high-pass filtering. FIG. 6 is a schematic diagram of the multi-frame fused signal when the tactile switch is OFF in the real-time tactile sensation generation method according to an embodiment of the present disclosure. The final fused signal y' is inputted to the vibration-audio integrated device 200 to achieve a separate sound effect.

The memory 802 may be used to store software programs and various data. The memory 802 may mainly include a program storage region and a data storage region. The program storage region may store an operating system, an application required by at least one function (such as a sound playback function and an image playback function), and the like. The data storage region may store data (such as audio data and a phone book) created according to use of a mobile phone. In addition, the memory 802 may include a high-speed random access memory, and may also include a non-volatile memory, such as at least one magnetic disk storage device, a flash memory device, or other volatile solid-state storage devices.

The processor 801 is a control center of a terminal, which uses various interfaces and lines to connect various parts of the entire terminal, and executes various functions of the terminal and processes data by running or executing software programs and/or modules stored in the memory 802 and calling data stored in the memory 802, so as to monitor the terminal as a whole. The processor 801 may include one or more processing units. In an embodiment, the processor 801 may integrate an application processor and a modem processor. The application processor mainly processes an operating system, a user interface, applications, and the like. The modem processor mainly deals with wireless communication. It may be understood that the above modem processor may not be integrated into the processor 801.

It is to be noted that, in use, the electronic device 800 can achieve the technical effect achieved by the above real-time tactile sensation generation method. Refer to the description in the real-time tactile sensation generation method above for details, which are not described herein again.

Embodiment 4

An embodiment of the present disclosure further provides a non-transitory computer-readable storage medium. The non-transitory computer-readable storage medium stores a real-time tactile sensation generation program. When the real-time tactile sensation generation program is executed by a processor, steps in the real-time tactile sensation generation method as provided in the present disclosure are implemented, so that the technical effect achieved is the same as the technical effect achieved by the above real-time tactile sensation generation method. Details are not described herein again.

The non-transitory computer-readable storage medium is, for example, a read-only memory (ROM), a random access memory (RAM), a magnetic disk, an optical disc, or the like.

It is to be noted that, herein, the terms such as "comprise", "include", and any variants thereof are intended to cover a non-exclusive inclusion, so that a process, method, item, or apparatus including a series of elements includes not only those elements but also other elements not expressly listed or elements inherent to the process, method, item, or apparatus. Without further limitations, an element defined by the statement "comprising/including a/an . . . " does not exclude the presence of additional identical elements in the process, method, item, or apparatus that includes the element.

Through the above description of the embodiments, those skilled in the art can clearly understand that the methods in the above embodiments can be implemented by software plus a necessary general hardware platform, which may be implemented by hardware, but in many cases the former is better. Based on such understanding, the technical solution of the present disclosure essentially or the part that contributes to the prior art can be embodied in the form of a software product. The computer software product is stored in a storage medium (such as a ROM/RAM, a magnetic disk, or an optical disc), and includes several instructions to cause a terminal (which may be a mobile phone, a computer, a server, an air conditioner, a network device, or the like) to perform the methods described in the various embodiments of the present disclosure.

The above are merely embodiments of the present disclosure. It should be noted herein that, for those skilled in the art, improvements can be made without departing from the creative concept of the present disclosure, but these all fall within the protection scope of the present disclosure.

What is claimed is:

1. A real-time tactile sensation generation method, applied to a vibration-audio integrated device, wherein the vibration-audio integrated device comprises a vibration actuator configured to generate vibration and a sound actuator configured to generate sound connected in series, and a capacitor connected in parallel with the vibration actuator, and the real-time tactile sensation generation method comprises the following steps:

acquiring a plurality of frames of audio signals by reading an original audio frame by frame; and determining on and off states of a tactile switch; wherein the tactile switch is configured to control an operating state of the vibration actuator:

outputting, when the tactile switch is in the off state, the audio signal after high-pass filtering to the vibration-audio integrated device to achieve a separate sound effect; wherein a frequency of the high-pass filtering matches a capacitance value; and generating, when the tactile switch is in the on state, a vibration signal corresponding to the audio signal of a current frame, fusing the audio signal of the current frame after high-pass filtering with the corresponding vibration signal, and outputting a fused signal to the vibration-audio integrated device to achieve a real-time tactile effect of combining sound and vibration.

2. The real-time tactile sensation generation method as described in claim 1, wherein the original audio is read frame by frame, every 200 ms is taken as one frame.

3. The real-time tactile sensation generation method as described in claim 1, wherein the step of acquiring the plurality of frames of audio signals by reading an original audio frame by frame further comprises: determining a number of channels of the original audio when a first frame of each original audio is read, and selecting, when two channels exist, an average value of two-channel data during reading of each frame.

4. The real-time tactile sensation generation method as described in claim 1, wherein, in the step of determining on and off states of a tactile switch, the generating, when the tactile switch is in the on state, a vibration signal corresponding to the audio signal of a current frame comprises the following sub-steps:

reading the audio signal of the current frame, acquiring instantaneous power thereof, and tracking and acquiring a power envelope thereof through a filter; and adaptively generating a vibration threshold according to the power envelope, setting a part of the power envelope that is greater than the vibration threshold to 1, and otherwise setting to 0 to obtain a vibration gain envelope, and filling the vibration gain envelope with a vibration signal.

5. The real-time tactile sensation generation method as described in claim 4, wherein the step of adaptively generating the vibration threshold according to the power envelope, setting the part of the power envelope that is greater than the vibration threshold to 1, and otherwise setting to 0 to obtain the vibration gain envelope, and filling the vibration gain envelope with the vibration signal comprises:

constructing an adaptive vibration threshold $T(t)$: $T(t)=f(T(t-1), E(t))$, so that, when $E(t)$ is greater than $T(t-1)$, the threshold $T(t)$ is adjusted upwards, and otherwise the threshold $T(t)$ is adjusted downwards to obtain the vibration gain envelope G; where t denotes the $t^{th}$ time of the current frame, $f( )$ denotes a constructed nonlinear function, and E denotes the power envelope; and convolving the vibration gain envelope G with a signal with a length L and a value x to obtain an updated vibration gain envelope G', and finally generating a vibration signal $H=G'*S$; where S denotes a vibration base signal, and the vibration base signal is a single-frequency sinusoidal signal composed of a resonant frequency f0 of the vibration actuator and a rated voltage vrms and having a same length as the audio signal.

6. The real-time tactile sensation generation method as described in claim 1, wherein, in the step of determining on and off states of the tactile switch, the fusing the audio signal of the current frame after high-pass filtering with the corresponding vibration signal, and outputting the fused signal to the vibration-audio integrated device comprises:

adding the vibration signal and the audio signal after high-pass filtering, performing normalization to obtain a final fused signal, and inputting the final fused signal to the vibration-audio integrated device.

7. A non-transitory computer-readable storage medium, wherein the non-transitory computer-readable storage medium stores a real-time tactile sensation generation program, and when the real-time tactile sensation generation program is executed by a processor, steps in the real-time tactile sensation generation method as described in claim 1 are implemented.

8. A real-time tactile sensation generation system, applied to a vibration-audio integrated device, the system comprising:

an audio reading module configured to acquire a plurality of frames of audio signals by reading an original audio frame by frame; and a high-pass filtering module configured to filter the audio signal; and a determination execution module configured to determine on and off states of a tactile switch; wherein the tactile switch is configured to control an operating state of the vibration actuator:

output, when the tactile switch is in the off state, the audio signal filtered by the high-pass filtering module to the vibration-audio integrated device to achieve a separate sound effect; and trigger, when the tactile switch is in the on state, a vibration signal generation module to operate;

the vibration signal generation module being configured to generate a corresponding vibration signal to achieve real-time touch based on the audio signal of the current frame when the determination execution module determines that the tactile switch is in the on state; and a fusion module configured to fuse, when the tactile switch is in the on state, the audio signal of the current frame filtered by the high-pass filtering module with the vibration signal corresponding thereto, to generate a fused signal to achieve a real-time tactile effect of combining sound and vibration.

9. The real-time tactile sensation generation system as described in claim 8, wherein the audio reading module is further configured to determine a number of channels of the original audio when a first frame of each original audio is read, and select, when two channels exist, an average value of two-channel data during reading of each frame.

* * * * *